United States Patent [19]

Katsuma et al.

[11] 4,420,240
[45] Dec. 13, 1983

[54] TRIPARTITE CAMERA WITH RELEASABLE COUPLING BETWEEN EACH PART

[75] Inventors: Makoto Katsuma, Kawasaki; Toyokazu Mizogui, Kiyose; Takashi Isobe; Akira Hiramatsu, both of Yokohama; Hiroyasu Murakami, Tokyo; Toyoki Ishida, Ageo, all of Japan

[73] Assignee: Canon Kabushiki Kaisha, Tokyo, Japan

[21] Appl. No.: 354,935

[22] Filed: Mar. 5, 1982

[30] Foreign Application Priority Data

Mar. 13, 1981 [JP] Japan ................................. 56-36933

[51] Int. Cl.³ ............................................ G03B 17/02
[52] U.S. Cl. .................................... 354/288; 354/275
[58] Field of Search ................ 354/202, 275, 286, 288

[56] References Cited

U.S. PATENT DOCUMENTS 2,911,894 11/1959 Hennig et al. ....................... 354/275
3,266,396 8/1966 Padelt .................................. 354/275
4,256,392 3/1981 Stemme et al. ..................... 354/288

Primary Examiner—A. A. Mathews
Attorney, Agent, or Firm—Toren, McGeady and Stanger

[57] ABSTRACT

A camera constructed from at least three different units or parts arranged in combination, with the units being releasably attached to each other by respective individual coupling devices which are made with a basically similar construction and which are operated to lock the individual camera parts together and to unlock the connection therebetween upon release actuation of the coupling devices.

3 Claims, 6 Drawing Figures

TRIPARTITE CAMERA WITH RELEASABLE COUPLING BETWEEN EACH PART

BACKGROUND OF THE INVENTION

1. Field of the Invention

This invention relates to a photographic apparatus constructed in the form of releasably attached interchangeable units.

2. Description of the Prior Art

In general, photographic apparatus equipped with interchangeable lenses, motor drive units, 250 exposure-film magazines and other interchangeable units are known as single lens reflex cameras. And, it is the practice in the prior art that these units are attached to the camera body in different coupling fashions from each other.

Therefore, for persons who are not well accustomed to devices formed of component units, it is troublesome and timeconsuming to assemble a desired complete camera from the component units, and it is difficult to operate the coupling means. In other words, the necessary units cannot be always quickly and easily attached to the camera body, or, even though attached, the fact that they may be incorrectly placed is often overlooked, thus not allowing the camera to operate normally. This leads to a high possibility of failed photographic operations.

It is an object of the present invention to eliminate the above-described drawbacks and to make similar the coupling methods for combining of successive units to each other.

This and other objects of the invention will become apparent from the following detailed description of an embodiment thereof.

DESCRIPTION OF THE PREFERRED EMBODIMENT

The present invention is next described in connection with an embodiment thereof by reference to the drawings.

Figure 1:
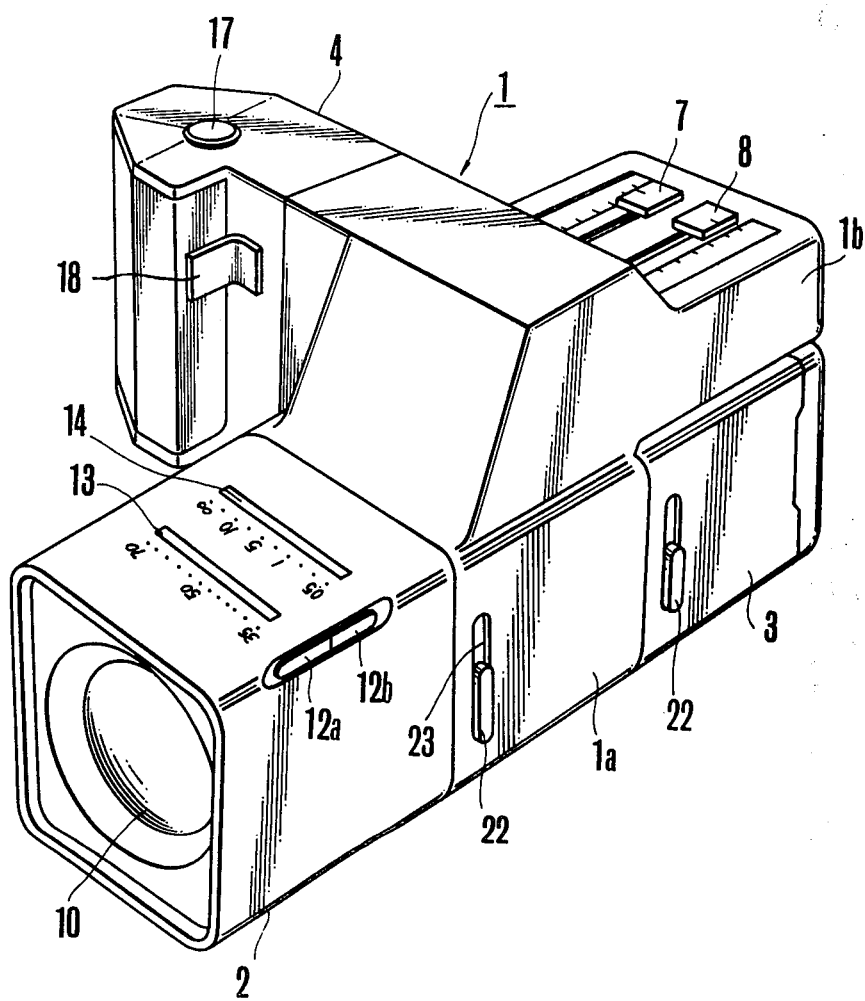
FIG. 1 illustrates an embodiment of the present invention and is a perspective view of a complete camera with its component units in the coupled positions.

FIG. 1 illustrates a camera constructed from the different units in combination as a whole. In FIG. 1, 1 is a camera body unit to which are attached an objective lens unit 2 at the front, a film magazine unit 3 at the rear and a grip unit 4 at the right, these parts being fixedly secured to each other by respective coupling devices which will be more fully described later so as to perform as a camera.

The basic unit 1 has a main portion 1a which contains a movable reflection mirror and a shutter, and a cover portion 1b which contains a finder optical system comprised of a focusing screen, pentaprism and the like and electrical circuit means with its rightwardly projected portion containing a shutter drive mechanism among others. 7 is a diaphragm presetting lever and 8 is a shutter speed presetting lever. Upon sliding movement of these levers so as to be placed in registry with desired graduations, the corresponding values of diaphragm aperture and shutter speed are set on an electrical circuit (not shown).

The lens unit 2 has a housing of square cross-section coincident with that of the housing of the main portion 1a of the above described basic unit 1 and containing an objective lens 10, an automatic focus adjusting mechanism (not shown) and an automatic zooming mechanism (not shown). 12a and 12b are zooming control buttons, 13 is a zooming position display device and 14 is a distance display device.

The magazine unit 3 is formed to a box-like shape having the same square cross-section as the lens unit 2, and contains a film reel, a film winding up motor. When attached to the basic unit 1, the unit 3 is also electrically connected thereto through terminals 16 (see FIG. 4).

The grip unit 4 formed to permit a steady holding of the camera by the right hand is attached to the right side of the basic unit 1, and contains a shutter drive motor and an electrical power source or batteries, these parts being arranged so that when attached to the basic unit 1, the motor is drivingly connected to the shutter mechanism through a gear train (not shown), and the batteries are connected through electrical terminals to the film winding up motor and the electrical circuit controlling the operation of the focusing mechanism and exposure determining means. 17 is a release button and 18 is a focusing control button.

Set forth hereinafter is a description of a coupling device for each unit.

Figure 2:
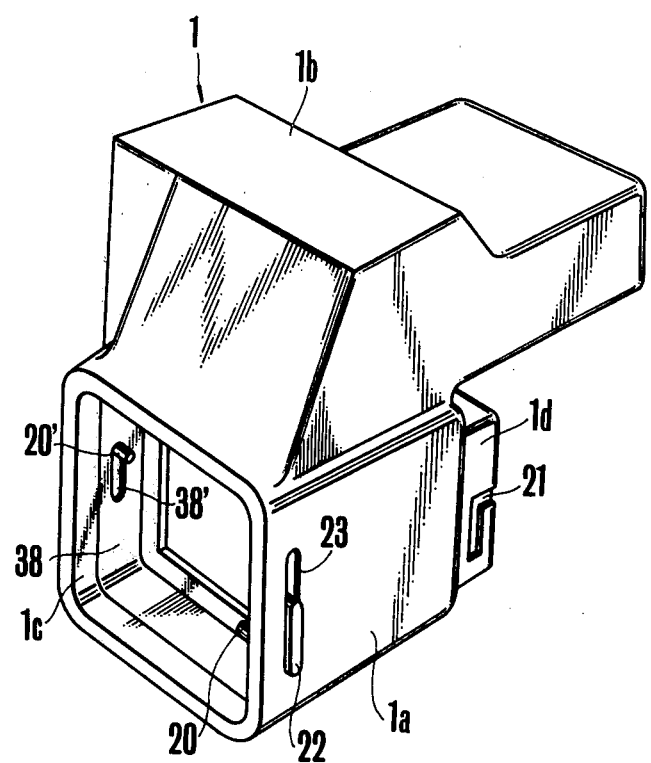
FIG. 2 is a perspective view of the basic unit of FIG. 1.
Figure 3:
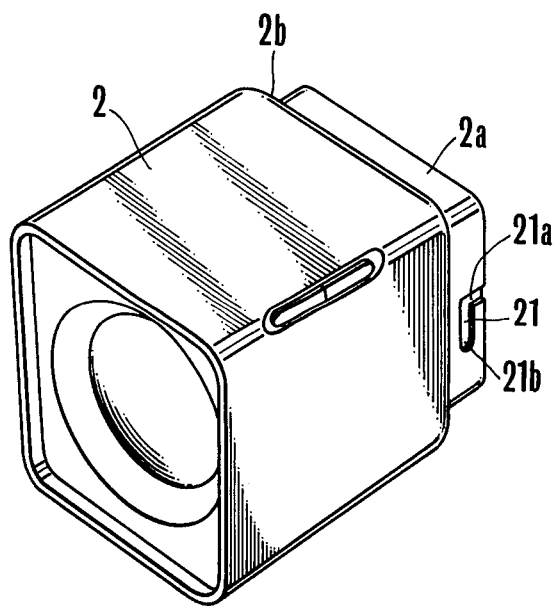
FIG. 3 is a perspective view of the lens unit of FIG. 1.

As illustrated in FIG. 2, formed in the front edge of the basic unit housing 1 is a frame-like lens unit bearing portion 1c. Two support pins 20 and 20' extend inwardly of the inner surface thereof. On the other hand, the lens unit housing 2 is provided at the rear side with a frame-like adapter portion 2a light-tightly fitted in said bearing portion 1c as illustrated in FIG. 3. The side walls of the adapter portion 2a are both provided with "L" shaped grooves 21 in which are fitted the support pins 20 and 20'.

Figure 6:
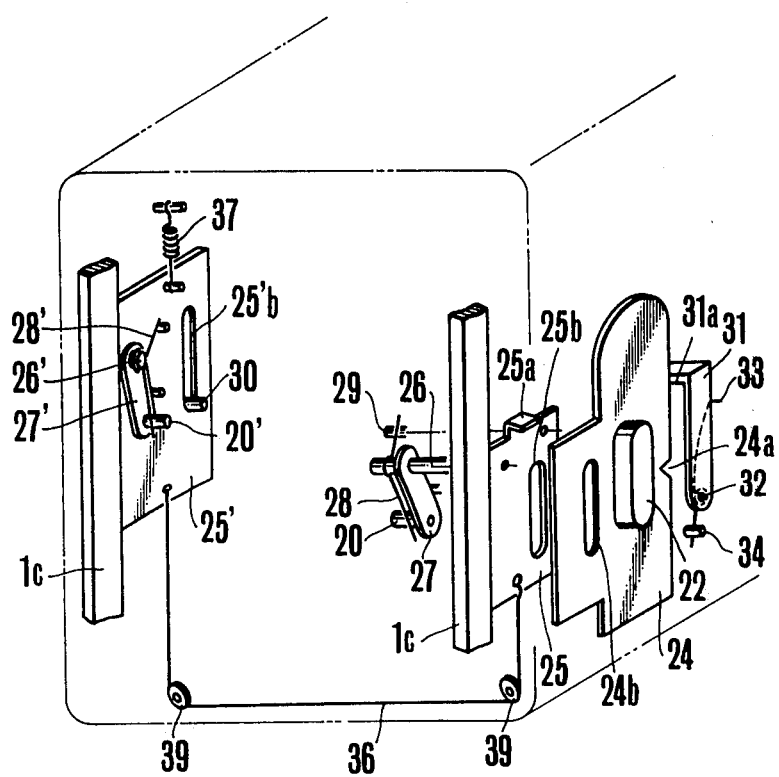
FIG. 6 is a perspective view illustrating the details of a coupling device used in each of the various units of FIGS. 2 to 5.

22 is a control knob extending outwardly of a vertically elongated slot 23 in the left hand side wall of the basic unit housing 1 and, as illustrated in FIG. 6, fixedly secured to a slide plate 24 on the inner surface of that side wall. 25 is a follower plate slidingly movable in unison with said control slide plate 24 by engagement at a bent portion 25a and having a pivot pin 26 mounted thereon about which a lever 27 having the support pin 20 can turn. 28 is a spring urging said lever 27 towards the rear of the camera and 29 is a spring abutment pin.

Both of the plates 24 and 25 are movable in vertical directions as are guided by their respective slots 24b and 25b engaging a common pin 30. 31 is a click lever of which the free end portion 31a is arranged to enter a click notch 24a in the side edge of the control plate 24 and which is pivotally mounted on a pin 32. A spring 33 urges the click lever 31 in a direction to engage against the control plate 24. 34 is a spring abutment pin. 25' is a second follower plate on the opposite inner surface to that on which the first follower plate 25 lies. A lever 27' pivotally mounted on a pin 26' which is fixedly mounted on the second follower plate 25' fixedly carries the second support pin 20'. The two follower plates 25 and 25' are connected to each other by a cable 36. Since the second follower plate 25' is urged upward by a spring 37, the pin 20' normally assumes an uppermost position, while the opposite pin 20 normally assumes a lowermost position. 39 are pulleys on which is trained the cable 36. These parts are accommodated in a recessed portion provided behind the bearing framework 1c, and this recessed portion is covered by a thin plate 38 which is just cleared from the adapter portion 2a of the lens unit housing and which has slightly over-sized slots 38' through and beyond which the respective pins 20 and 20' project outwardly.

When attaching the lens to the camera unit, the operator must lift the control knob 22, whereby the control plate 24 and the follower plate 25 engaging therewith are moved upwards in unison, while simultaneously the opposite follower plate 25' is pulled down by the cable 36. When the click groove 24a reaches the free end 31a of the click lever, the control plate 24 is latched in this position, and the follower plates 25 and 25' are held stationary in the uppermost and lowermost positions respectively against the force of the return spring 37.

Then, when the rear adapter portion 2a of the lens unit is inserted into the bearing portion 1c of the basic unit, the horizontal portions of the "L"-shaped grooves 21 receive the respective pins 20 and 20'. When the shoulder 2b comes to abut on the front edge of the basic unit housing 1, the operator then needs to push down the control knob 22 to take the click stop means 24a and 31a out of action, whereby the follower plates 25 and 25' are moved in the reversed directions to those described above under the action of the spring 37. Thus, the first support pin 20 moves downwards in the vertical portion 21b of the "L" shaped groove 21, while the 2nd support pin 20' moves upwards in the vertical portion 21b' of the "L"-shaped groove 21', and they are stopped in certain prescribed positions.

At this time, the spring 28 and 28' press the support pins 20 and 20' against the rear side edges of the slots 38'.

The adapter portion 2a of the lens unit is light-tightly fitted in the stepped down portion 1c of the basic unit housing 1 and is steadfastly retained in this position by virtue of the bias springs 28 and 28'.

When detaching the lens unit from the camera, the control knob 22 is pushed upwards again. When the pins 20 and 20' are aligned with the horizontal portions of the L-shaped grooves 21, the lens unit can be pulled out. Thus, demounting is a very quick and easy operation.

Figure 4:
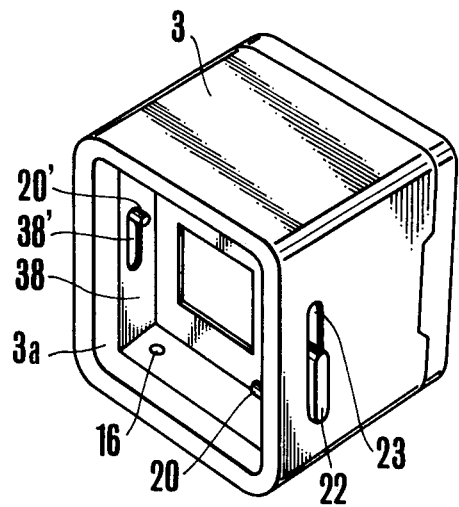
FIG. 4 is a perspective view of the magazine unit of FIG. 1.

The magazine unit 3 also has an adapter-receiving portion 3a formed in the front edge of the housing thereof to a similar shape as that of the bearing portion 1c of the basic unit 1 to permit a light-tight fitting of a rear adapter portion 1d of the basic unit 1. Positioned just behind the adapter receiving portion 3a is a coupling device similar in construction to that in the basic unit. That is, two support pins 20 and 20' drivingly connected to the control knob 22 project inwardly of the inner surfaces of the thin plate casing 38 through the vertical slots 38' as illustrated in FIG. 4, and they are adapted to engage in the "L"-shaped grooves 21 of the basic unit housing 1 of FIG. 2.

Figure 5:
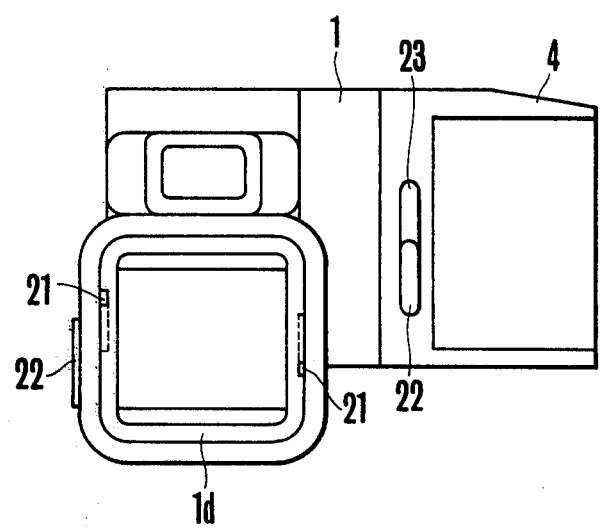
FIG. 5 is an elevational view looking from the back of the basic and grip units of FIG. 1 in combination.

Also the grip unit 4 has an adapter receiving portion of the same construction as that described above in respect to the basic unit 1 and a coupling device of the same construction with the control knob 22 located on the rear wall thereof as illustrated in FIG. 5.

The coupling devices in the magazine and grip units are similar in construction to that described in connection with FIGS. 2, 3 and 6. Therefore no more detailed explanation is given here.

It is also to be noted that the successive two units are combined with each other in edgewise overlapping relation for assurance of the light tight seal, and that the bottom walls of the various units and the contiguous side walls thereof are configured to lie in the same planes respectively.

The present invention provides a camera having a number of component units in combination, wherein the various different units are attached to each other at the same fitting level with advantages that assembly of a complete camera becomes a very quick and easy operation and that a good unity of execution can be formed from the design standpoint. Particularly in the camera of which the housing is designed to have many common flat planes over the various component units as illustrated in connection with the embodiment of the invention, the use of the coupling method of the invention assists in promoting aesthetic enhancement. Another advantage is that, because the coupling device of the invention is common to all the component units, the production cost is significantly reduced.

What we claim is:

1. A camera having at least three separable parts arranged in combination comprising:

fitting means for fitting each of said parts to another part so as to have portions thereof overlap, said fitting means being arranged to fit each of said parts so that at least one side of each part is arranged to lie in a common plane with a side of another part;

coupling means for coupling two successive parts with each other by respective coupling devices having common structures, said coupling means being operable between a locked state to retain said parts coupled together and an unlocked state to release the coupling engagement between said parts; and operating means for operating said coupling means to bring said coupling means between said locked state and said unlocked state, said operating means being positioned respectively at sides of said parts arranged to lie in a common plane with a side of another part.

2. A camera according to claim 1 wherein said operating means are arranged for sliding movement along said common plane to operate said coupling means between the locked state and the unlocked state.

3. A camera according to claim 1, wherein said coupling means is provided in said overlapped portion.

* * * * *